J. M. HAWLEY.
PLOW.
No. 66,335. Patented July 2, 1867.
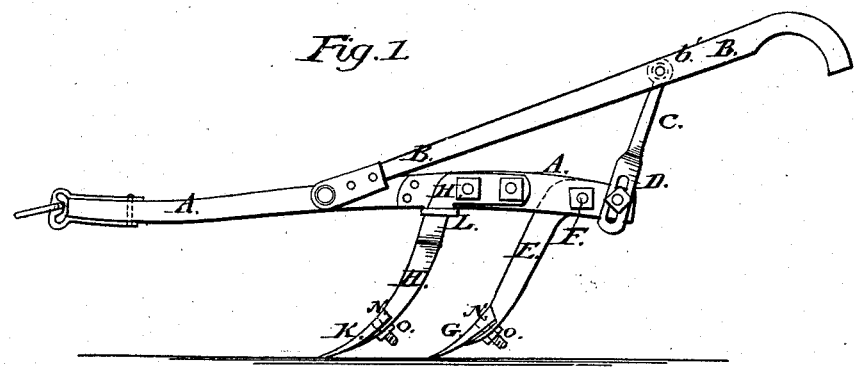
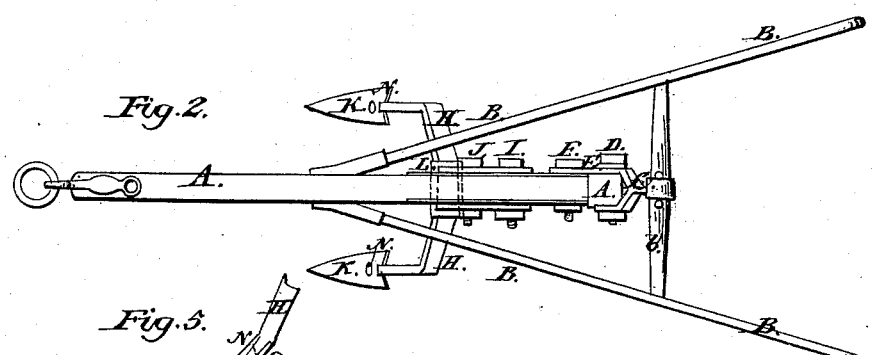
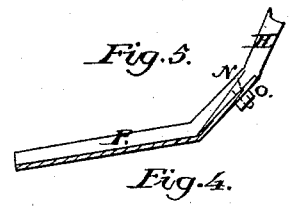
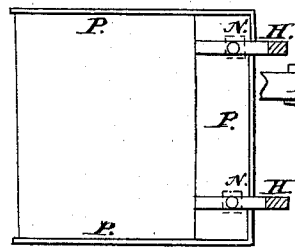
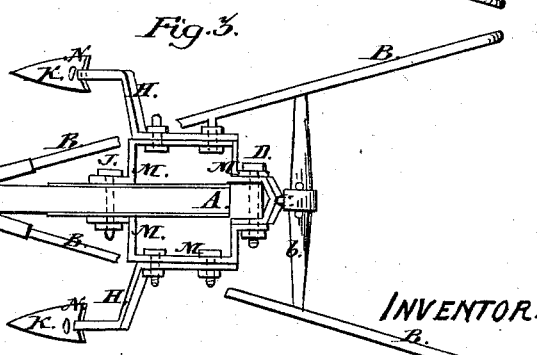
WITNESSES:
INVENTOR:

United States Patent Office.

JAMES M. HAWLEY, OF HOLTON, INDIANA.

Letters Patent No. 66,335, dated July 2, 1867.

---

IMPROVEMENT IN PLOUGHS.

---

The Schedule referred to in these Letters Patent and making part of the same.

---

TO ALL WHOM IT MAY CONCERN:

Be it known that I, JAMES M. HAWLEY, of Holton, in the county of Ripley, and State of Indiana, have invented a new and useful Improvement in Plough; and I do hereby declare that the following is a full, clear, and exact description thereof, which will enable others skilled in the art to make and use the same, reference being had to the accompanying drawings, forming part of this specification, in which—

Figure 1 is a side view of my improved plough.

Figure 2 is a top view of the same.

Figure 3 is a top view of the same when arranged for furrowing or marking the ground for planting.

Figure 4 is a top view of the scraper-plate, the standards being broken off.

Figure 5 is a detail sectional view of the same.

Similar letters of reference indicate like parts.

My invention has for its object to furnish a cheap, strong, and durable plough, which may be adjusted for use as a single, double, or triple plough, and which may be readily converted into a scraper when desired; and it consists in the construction of the standards, and in the manner in which they are combined with the shovels and plough-beam; in the combination of the handles and forked and slotted connecting-bar with the plough-beam; in the combination of the bent bars or frame with the uprights and plough-beam; and in the combination of the scraper-plate with the forward standards, the whole being constructed and arranged as hereinafter more fully described.

A is the plough-beam, which may be made of wood or iron, as may be desired. B are the handles, the forward ends of which are pivoted to the middle part of the beam A by a bolt passing through them and the said beam. The rear parts of the handles B are adjustably supported by a connecting-bar, C, the upper end of which is connected to the round b' of the handles, and its lower end is forked so as to receive the rear end of the beam A between its arms, and to which it is secured by a bolt, D, passing through slots formed in the said arms and through the rear end of the beam A, so that by loosening the nut of the bolt D, the elevation of the handles may be adjusted as desired. E is the rear plough-standard, the upper end of which is secured to the side of the rear end of the beam A by the bolts D and F. The standard E is then bent downward and sideways, so as to pass down to the ground directly beneath the central line of the beam A, and to its lower end is attached the shovel G. H are the forward standards, which are attached to the opposite sides of the beam A at a suitable distance in front of the standard E, where they are secured in place by the bolts I and J. The standards H are then bent downwards and outward, so that the ploughs or shovels K may be at a sufficient distance apart. L is a link, placed beneath the beam A, through which the standards H are passed, to strengthen the standards and prevent the strain from coming upon the parts weakened by the bolt-holes.

In case it is desired to use the plough for marking or "furrowing out" the ground for planting, the standards H and E are removed, and the bars M bent into the shape shown in fig. 3, are secured to the beam A by the bolts J and D. The standards H are then bolted to the outer or inner sides of the bars M, as may be desired. The distance of the ploughs K from each other may be adjusted as required by the interposition of wooden blocks or bars of the requisite thickness between the standards H and bars or frame M. The shovels K and G are secured to the standards H and E by bolts N and nuts O, so as to be removable, and are secured against side pressure by having notches formed upon their upper edges, to receive the square shoulders formed upon the lower parts of the said standards. P is a scraper-plate, which, when in use, is attached to the standards H, the shovels K being removed, and is secured in place by the bolts N and nuts O, as shown in figs. 4 a 5. When the machine is used as a scraper, the rear standard E should be removed.

What I claim as new, and desire to secure by Letters Patent, is—

1. The standards H and E, constructed substantially as herein described, in combination with the shovels K and G and beam A, in the manner and for the purpose set forth.

2. The combination of the handles B and forked and slotted connecting-bar C with the beam A, substantially as herein shown and described and for the purpose set forth.

3. The combination of the bent bars or frame M with the beam A and standards H, substantially as herein shown and described and for the purpose set forth.

4. The combination of the scraper-plate P with the forward standards H, substantially as herein shown and described and for the purpose set forth.

JAMES M. HAWLEY

Witnesses:
A. J. RALSTON,
D. FRENDENSTEIN.